April 28, 1942. F. J. CULLOMER 2,281,271
TOASTER
Filed Sept. 11, 1940
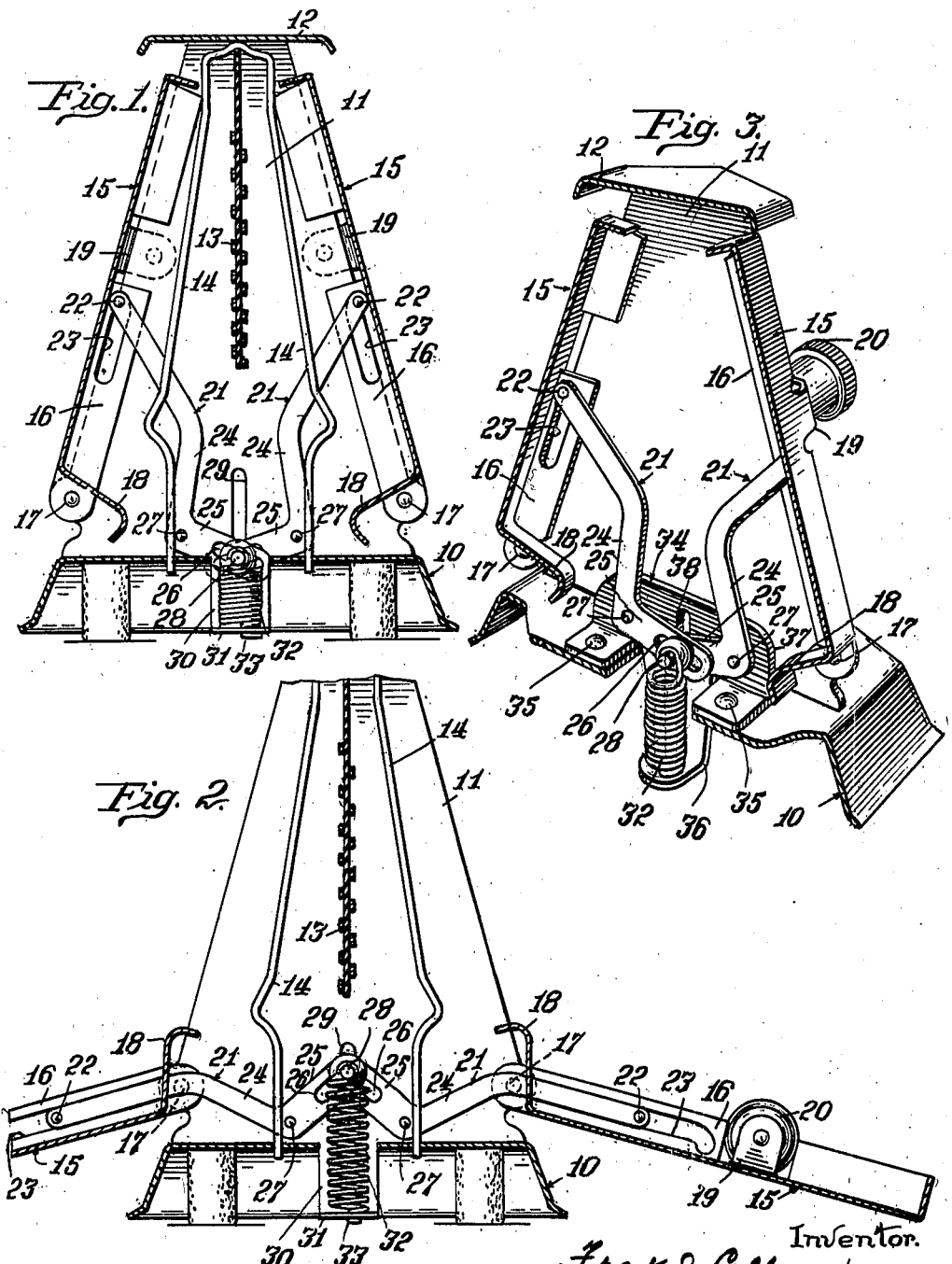
Inventor.
Frank J. Cullomer,
By
Attorney Patented Apr. 28, 1942

2,281,271

UNITED STATES PATENT OFFICE 2,281,271

TOASTER

Frank J. Cullomer, Chicago, Ill., assignor of one-third to Erich O. Steudel, Chicago, Ill.

Application September 11, 1940, Serial No. 356,319

10 Claims. (Cl. 53—5)

My invention relates to a bread toaster of the downwardly swinging side wall or door type, namely with the opposite sides or doors pivotally mounted at their lower ends so as to swing outwardly and downwardly into complete open position for insertion of the slices of bread and for withdrawal of the pieces of toast.

The invention has for its object the provision of means whereby both doors will be simultaneously actuated through the operation of either one of the doors, namely by simply manually operating one of the doors to either partial or complete open position; the invention involving means whereby operative connection between both doors is provided and resilient means are employed for urging both doors to closed position.

One object of the invention is the provision of means, involving one or more resilient elements, which is arranged beyond the heating zone of the toaster and which affords greater leverage action by reason of the shifting operative connections between the doors and said means and as a result easier and smoother operation produced.

Another object of the invention is the provision of means whereby both doors through the manipulation of one, may be uniformly brought to complete open position, while the weight of the doors when fully opened will maintain the doors in open position; the relation between the resilient element and the remainder of said means being such that manual operation of one door will cause uniform movement of the other door.

A further object of the invention is the provision of a structure wherein the resilient element of said door controlling means is subjected to a direct axial expansion or pull at an intermediate point in the toaster beyond the range of the pivotal points of the doors.

The invention also has for its object the provision of a comparatively simple construction which is inexpensive in manufacture and less likely to get out of operative condition.

The above enumerated objects and advantages, as well as other advantages inherent in the invention, will all be readily comprehended from the following detailed description of the drawing wherein—

Figure 1 is a vertical sectional view of my improved toaster looking toward one end wall with the side doors in closed position and a portion of the heating element broken away.

Figure 2 is a similar view with the top of the toaster broken away showing the doors in complete open position; one of the doors being broken away.

Figure 3 is a perspective view of one end wall of the toaster as viewed from the inside, with portions of the top and bottom of the toaster and of the side walls or doors broken away and in section and the latter shown in closed position; the figure illustrating a modification of the invention.

The exemplification shown in the drawing discloses a well known flip-flop type of toaster wherein turning of the toast may be induced during a rapid manipulation of the doors. The toaster shown in the drawing consists of a suitable inversely dished base 10, end walls 11 (of which only one is shown) which, in the toaster illustrated, taper toward the top; the end walls at bottom being suitably secured to the base 10 while their tops are connected to the top wall 12. A suitable heating element—a portion whereof is shown at 13—is arranged vertically between the top 12 and the base 10 in the usual manner, with the usual grills 14 arranged in spaced relation on opposite sides of the heating element 13.

The two sides of the toaster consist of the doors 15, 15 arranged at an inward inclination toward the top. The doors at the sides are flanged as at 16, which are adapted to extend within the end walls when the doors are closed; the flanges at the lower ends of the doors being pivotally connected at 17 to the end walls of the toaster. The lower portions of the doors, intermediate of the side flanges 16, are usually provided with inwardly projecting toast supporting flanges 18. A portion of one side flange 16 of each door is partially severed and bent outwardly as at 19 to receive the usual finger grasping knob, as shown at 20.

The structure thus far described is of the usual construction.

The present invention relates to means which provide an operative connection between the two doors whereby the manual manipulation of one door will induce simultaneous operation of the other door without the need for the manual operation of separate mechanism.

This means consists of a pair of similar levers 21, whose outer ends are each provided with a pin at 22 which extends into the slot 23 arranged lengthwisely in the door flanges 16 adjacent the end of the toaster where the levers 21 are located.

The levers 21, intermediate of their ends, are gradually curved or bent downwardly as at 24 and thence laterally in an almost right angular manner, as shown at 25, in the nature of bell-crank levers and the ends of the portions 25 being each provided with a longitudinally disposed slot 26.

The levers 21, at the juncture of the bent portions 24 and 25, are pivotally connected at 27 to the adjacent end wall 11 of the toaster; while the slots 26 of the levers have a small bolt or pin 28 disposed therethrough which is adapted to slide lengthwisely of the slots 26 when the levers swing about their pivots 27. The pin 28 also extends through a slot 29 in the toaster end wall 11 and disposed vertically as clearly shown in Figure 1, thus causing the pin 28 to ride vertically during swinging movement of the levers whose cooperating relation is produced by the pin 28. That is to say, movement of one door 15 to open position causes the pin or roller 22 at the outer end of the associated lever 21 to ride toward the lower end of the slot 23 of the door, causing the lever to tilt about its pivot point 27 so as to swing its slotted end 25 upwardly and move the bolt or pin 28 upwardly in the slot 29 made possible by the slot 26 in the lever.

As the bolt or pin 28 also extends through a similar slot 26 in the other lever 21, it is apparent that similar movement is simultaneously imparted to the other lever and hence its associated door is likewisely actuated.

The end wall 11 is preferably provided with a downwardly disposed extension 30 whose lower end is bent laterally at 31 to permit the lower end of a vertically disposed coil spring 32 to be secured thereto, as shown at 33; while the upper end of the spring 32 is attached to the inner end of the bolt or pin 28 and exerts a downward pull on the bolt or pin, causing the latter to slide toward the bottom of the slot 29 and consequently exerting a downward pull on the lower slotted ends 25 of both levers 21. This downward pull on the lower ends of the bell-crank levers 21 causes the latter to tilt about their pivot points 27 so as to move their upper free ends inwardly, which in turn forces the doors 15 to complete closed position after the door has been urged slightly upwardly from its extreme open or lowered position.

In view of the operative relation between the slotted ends of the levers, both doors are caused to move in unison through the direct vertical pull of the spring 32 on the bolt or pin 28 which passes through the slots 26 of both bell-crank levers whose free ends have slidable controlling relation with the doors by reason of the slots 23 in the door flanges 16.

In the exemplification the door controlling means is shown arranged at one end of the toaster and associated with one flange of each door, but if desired, means similar to that shown and described may be arranged at both ends of the toaster.

Toasters are occasionally made with end walls which, in order to provide a difference in design, are dished or bowed outwardly at the bottom slightly beyond the plane of the pivot points of the doors and hence somewhat removed, laterally from the lower slotted ends of the levers 21.

In order to employ the simple construction of lever and provide a guiding slot adjacent the bolt or pin 28, I illustrate a modification in Figure 3 which consists in providing the bracket 34 whose bottom flanges may be riveted or otherwise suitably secured as at 35 to the base 10 which latter, as in the previous figures, is cut away or has an opening for the reception of the vertically disposed spring 32 and also for passage a depending leg 36 formed integral with the intermediate portion of the bracket 34; the lower end of the spring 32 being suitably secured to the lower end of the leg 36 as for example in the manner shown in Figure 1. The vertically disposed side 37 of the bracket 34, in horizontal alignment with the bolt or pin 28, is provided with the vertically disposed guide slot 38 to receive the end of the bolt or pin 28 and maintain the latter in proper vertical alignment with the spring and provide a uniform pulling action on the slotted ends of the bell-crank levers 21. The construction and operation of the levers in the modification are similar to those of levers 21 in Figure 1, with their free ends having a slidable controlling relation with the doors by means of the slots 23 arranged in the door flanges 16.

As is apparent from the construction shown, the spring is arranged to exert a direct downward pull on the levers and is arranged beneath the heating zone and hence not subjected to periodic heating during use of the toaster; and by reason of the construction a comparatively short and hence less expensive spring may be employed.

Both levers 21 are identical in construction and, therefore, may be made with the same die which consequently materially reduces the initial cost of manufacture; the lever arrangement with the slidable and positive operative engagement with the doors provides for greater door controlling leverage during closing movement of the doors and hence affords easier operation and uniform movement of the doors.

The exemplifications shown and described are believed to be the best embodiments of the invention and have been described in terms employed for purposes of description and not as terms of limitation as structural modifications are possible and may be made without, however, departing from the spirit of my invention as defined in the appended claims.

What I claim is:

1. In a toaster, a pair of opposed doors hingedly mounted at their lower ends to swing downwardly outward; lever members pivotally mounted intermediate their ends to a wall of the toaster, the outer ends of the levers having slidable operative connections with the doors; and resilient means operatively associated with a wall of the toaster and the inner ends of said levers whereby the levers are operatively connected together and simultaneous operation of both doors is effected by the actuation of one of the doors.

2. In a toaster, a pair of opposed doors hingedly mounted at their lower ends to swing downwardly outward; lever members arranged in the toaster and pivotally mounted intermediate of their ends to move through vertical arcs, the outer ends of the levers having slot and pin connection with the doors; and resilient means immovably secured to the toaster and operatively associated with the inner ends of said levers whereby the inner ends of the levers are operatively connected and actuation of one door induces simultaneous operation of both doors.

3. In a toaster having end walls, a pair of opposed doors, bell-crank levers located within the toaster and pivotally mounted at the angular portions of the levers to swing through vertically disposed arcs, the outer ends of said levers having slidable slot and pin connections with the doors; and vertically movable resilient means whereby the inner ends of said levers are operatively connected and downward pull on the inner ends of both levers exerted and actuation of one door induces simultaneous operation of the other door.

4. In a toaster having end walls, a pair of opposed doors hingedly mounted at their lower ends to open downwardly outward and provided with longitudinally disposed slots; a pair of levers pivotally mounted intermediate their ends to swing vertically and having slidable operative connection with the door slots; and resilient means operatively associated with one of the ends of each lever and having slidable connection with a wall of the toaster whereby movement of one door induces similar movement of the other door.

5. In a toaster having an upstanding housing, a pair of opposed doors hingedly mounted at their lower ends to said housing and provided with longitudinally disposed slots; a pair of levers pivotally mounted in the housing intermediate of their ends and the inner ends arranged in juxtaposition while their outer ends are slidably connected with said slots; resilient means operatively connected with the inner juxtaposed ends of the levers to exert a downward pull thereon and normally tending to hold the doors in closed position; and movable means whereby the action of said resilient means is uniformly transmitted to said levers, whereby actuation of one door induces simultaneous operation of both doors.

6. In a toaster having an upstanding housing, a pair of opposed doors hingedly mounted at their lower ends on the housing to swing downwardly outward; a lever for each door pivotally mounted intermediate its ends in the housing having a slidable operative connection with the door at its upper end while the lower end of the lever extends inwardly beyond the vertical plane of the pivoted point of the lever; means intermediate of the lower ends of the levers of the opposed doors whereby the levers are caused to move in unison; and means whereby said first means is placed under pressure and said levers induced to move the doors to closed position.

7. In a toaster, a pair of opposed doors hingedly mounted at their lower ends to swing downwardly outward; levers pivotally mounted intermediate their ends, the outer ends of the levers having slidable operative connections with the doors at points removed from the pivoted ends of the doors; vertically movable means common to said levers whereby simultaneous operation of both doors is obtained through the actuation of one of them; and resilient means whereby a downward pulling force on said movable means is exerted and said levers induced to move both doors to closed position.

8. In a toaster having an upstanding housing, a pair of opposed doors hingedly connected at their lower ends to the housing to swing downwardly outward and each provided with a longitudinally disposed slot; levers pivotally connected intermediate their ends to the housing with their upper ends having slidable connection with said slots while the lower ends of the levers are arranged in juxtaposition with each other; vertically movable means operatively associated with said lower ends of the levers adapted to induce simultaneous operation of the levers; and means arranged in the housing and connected with said first means for normally forcing the latter and said levers toward door closing position.

9. In a toaster, a pair of opposed doors hingedly mounted at their lower ends and each provided with a longitudinally disposed slot intermediate the upper end of the door and the hinge; vertically disposed levers pivotally mounted adjacent the base of the toaster, the upper ends of the levers being slidable in said slots while the other ends of the levers have slot and pin connection with each other; means whereby the pin is made to travel in a vertical path; and resilient means associated with the pin and normally tending to tilt said levers in door closing direction.

10. In a toaster provided with a door pivoted at one end to open outwardly; a bell-crank lever pivotally mounted intermediate its ends adjacent the base of the toaster with its upper end having slidable operative connection with the door; and resilient means intermediate a wall of the toaster and the lower end of the lever whereby the latter is urged to move through a vertically disposed arc into door closing position.

FRANK J. CULLOMER.